United States Patent [19]
Sato

[11] 3,991,701
[45] Nov. 16, 1976

[54] BEARING WEAR DETECTING DEVICE FOR CANNED MOTOR DRIVEN PUMPS

[75] Inventor: Ryuich Sato, Tokyo, Japan

[73] Assignee: Nikkiso Co., Ltd., Tokyo, Japan

[22] Filed: Aug. 21, 1975

[21] Appl. No.: 606,603

[52] U.S. Cl. .......................................... 116/114 Q
[51] Int. Cl.² ........................................ G01D 3/08
[58] Field of Search ................... 116/114 Q, 114 R; 308/1 A; 415/118

[56] References Cited
UNITED STATES PATENTS

| | | | |
|---|---|---|---|
| 3,678,883 | 7/1972 | Fischer | 116/114 Q |
| 3,797,451 | 3/1974 | Tiraspolsky | 116/114 Q |
| 3,853,087 | 12/1974 | Aldag | 116/114 Q |

*Primary Examiner*—S. Clement Swisher
*Assistant Examiner*—Denis E. Corr

[57] ABSTRACT

A bearing wear detecting device for canned motor driven pumps is disclosed. The device comprise a rotary shaft of a canned motor driven pump having a hole extending in an axial direction from one end of said rotary shaft; an enlarged chamber formed in said hole at a position distant apart from said one end of said rotary shaft by a given distance and having a diameter larger than that of said hole and forming shoulders at boundaries between said hole and said enlarged chamber; and a hermetically sealed pipe provided at its one end with an enlarged sensitive portion and at another end an indicator; said enlarged sensitive portion being enclosed in said enlarged chamber of said rotary shaft. To the one end of the rotary shaft may be secured an end nut with said hole and said enlarged chamber formed therein. The hermetically sealed pipe may be composed of an indicating part and a detecting part telescopically engaged with each other.

8 Claims, 15 Drawing Figures

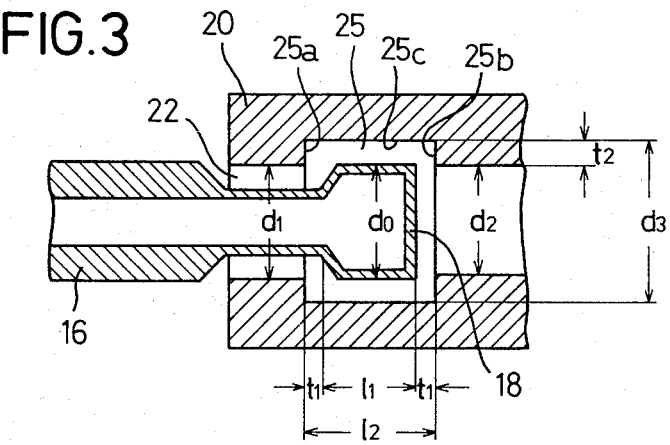
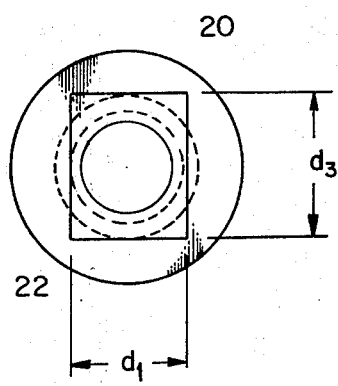
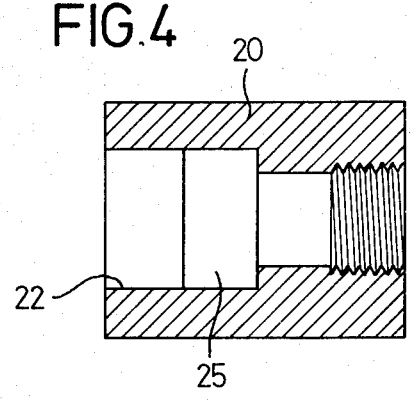
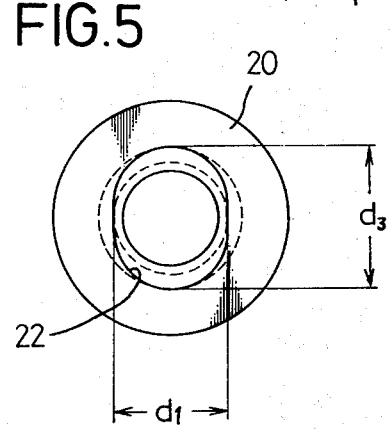
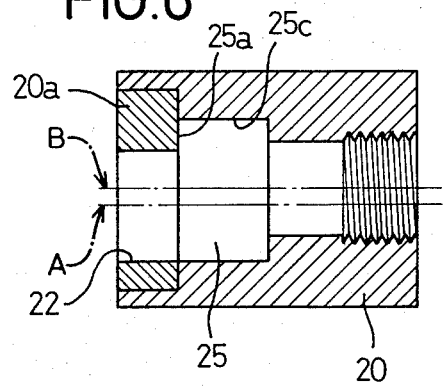
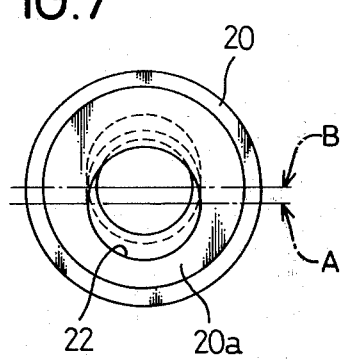

BEARING WEAR DETECTING DEVICE FOR CANNED MOTOR DRIVEN PUMPS

This invention relates to an improvement in or relating to a bearing wear detecting device which can detect a degree of wear of bearings for a rotary shaft of a canned motor driven pump.

A canned motor driven pump comprises a rotary shaft completely immersed into liquid to be treated. The canned motor driven pump comprises no movable part which is extended through the liquid immersed rotary shaft and an outer can or housing and hence no rotary shaft sealing part. As a result, the canned motor driven pump is of a completely no leakage type which can completely eliminate problems on leakage of the liquid to be treated and on suction of atmospheric air and which is significantly usable as a processing pump.

In the canned motor driven pump, all of a radial load and a thrust load produced by a rotary motion are subjected to bearings of a rotary shaft. The bearings are lubricated by the liquid to be treated. In addition, treating liquid is used under various conditions so that the bearings become worn in various modes. As a result, it is impossible to predetermine a usable life of the bearings so that after the canned motor driven pump has been incorporated into a plant, the degree of the bearing wear could not be known except at a time of a periodical inspection or at a time of break down of the plant or pump.

If the bearings become worn in a radial direction beyond an allowable wear limit during the operation of the pump, a rotary shaft is urged against a pump housing, thereby rupturing the rotary shaft or housing. In addition, if the bearings become worn in a thrust direction beyond an allowable wear limit during the operation of the pump, an impeller is urged against the pump housing, thereby rupturing the impeller or housing. As a result, no lubrication is effected along the inner peripheral parts of the bearings, thus resulting in acceleration of a bearing wear produced in the radial direction.

In order to obviate such disadvantages, a bearing wear detecting device which has heretofore been proposed is provided at one end of a rotary shaft 10 with a cylindrical hole 12 which is concentrical with the rotary shaft 10 as shown in FIG. 1. Such conventional bearing wear detecting device 14 comprises a hermetically sealed pipe 16 which is provided at its front end with a sensitive portion 18.

The sensitive portion 18 is arranged in the cylindrical hole 12 at a position distant apart from the one end wall and the inner peripheral wall of the hole 12 by a given distance.

When bearings of the rotary shaft 10 become worn in a thrust direction or a radial direction or a composite direction resulted from both the thrust and radial directions beyond an allowable wear limit, the rotary shaft 10 is eccentrically rotated to urge the one end wall or the inner peripheral wall of the cylindrical hole 12 against the sensitive portion 18 of the hermetically sealed pipe 16 to rupture it. Thus, the conventional bearing wear detecting device shown in FIG. 1 makes use of one hermetically sealed pipe 16 only for the purpose of detecting the bearing wear condition irrespective of the modes of the bearing wear.

Such conventional bearing wear detecting device shown in FIG. 1 has the following disadvantages. If thrust bearings become worn by a thrust of the rotary shaft 10 toward the pump side, the rotary shaft 10 is displaced in the same direction as the inserting direction of the hermetically sealed pipe 16 as shown by an arrow so that it is impossible to directly detect the bearing wear.

Heretofore, it has been the common practice to detect the bearing wear in the radial direction derived from the above mentioned kind of bearing wear, and as a result, the conventional bearing wear detecting device shown in FIG. 1 is not satisfactory as a detecting device which is precise in operation.

In addition, the conventional bearing wear detecting device shown in FIG. 1 makes use of a hermetically sealed pipe 16 which contains therein a pressure gas having a relatively high pressure of the order of 5 $kg/cm^2$ to 10 $kg/cm^2$ for the purpose of precisely detecting the bearing wear, which could not be effected by the atmospheric pressure. As a result, after the sensitive portion 18 has been ruptured and an indicator 26 has indicated the bearing wear, it is difficult to replace the sensitive portion 18 by a new one at the installation site and in practice the detecting device 14 as a whole is discarded as useless waste.

Experimental tests have yielded the surprising result that if the rotary shaft 10 is provided at its one end with a hole 12 having a minimum diameter which is sufficient to insert into thereinto the enlarged front sensitive end 18 of the hermetically sealed pipe 16 of the detecting device 14 and if the hole 12 is enlarged at a position distant apart from its end by a given distance so as to form an enlarged portion having a radial length which permits to produce the bearing wear in a radial direction and an axial length which permits to produce the bearing wear in a thrust direction and form shoulders at each end of the enlarged portion and if the bearing wear in the radial direction and the front and rear thrust directions causes the rotary shaft to move, either the enlarged portion or one of the shoulders is urged against the front enlarged end portion 18 of the hermetically sealed pipe 16 of the detecting device 14 to rupture it and lock out a pressure gas contained therein, thereby rapidly and reliably detecting the bearing wear condition.

Experimental tests have also yielded the surprising result that if the detecting device 14 is composed of two parts, that is, an indicating part and a detecting part and if these parts are telescopically engaged with each other to hermetically seal between these parts, it is possible to insert before hand the detecting part into the end nut secured to one end of the rotary shaft and then insert the indicating part into the detecting part so as to hermetically seal between these parts, that when the rotary shaft 10 becomes moved in front or rear thrust direction the end nut is urged against the sensitive portion formed at the front end of the detecting part to cause it to wear and rupture, that when the indicating part is inserted into the detecting part the indicating part serves as a piston to increase the inside pressure of the indicating part, thereby easily assembling the detecting device as a whole, and that after the detecting part has detected the bearing wear it can easily be replaced by a new one at the installation site of the detecting device and the existing indicating part can be used again.

An object of the invention, therefore, is to provide a bearing wear detecting device for canned motor driven pumps, which is simple in construction and which can reliably detect at early stages the bearing wear condition in a radial direction or thrust directions and a composite direction resulted from both the radial and the thrust directions.

Another object of the invention is to provide a bearing wear detecting device for canned motor driven pumps, which is compared of an indicating part and a detecting part, these parts being independently manufactured and detachably assembled together, the detecting part being arranged such that its sensitive portion formed at its front end becomes reliably worn and rupured by the bearing wear in the front and rear thrust directions and the indicating part being telescopically inserted into and around the detecting part so as to hermetically seal between these parts and increase the inside pressure of the detector, and which is easy in manufacture and simple in assembling.

A feature of the invention is the provision of a bearing wear detecting device for canned motor driven pumps, comprising a rotary shaft of a canned motor driven pump having a hole extending in an axial direction from one end of said rotary shaft; an enlarged chamber formed in said hole at a position distant apart from said one end of said rotary shaft by a given distance and having an inner diameter larger than that of said hole and forming shoulders at boundarys between said hole and said enlarged chamber; and a hermetically sealed pipe provided at its one end with an enlarged portion and at another end an indicator, said enlarged portion being enclosed in said enlarged chamber of said rotary shaft, whereby when the bearing wear causes said rotary shaft to move in a thrust direction, said shoulders are urged against a part of said enlarged end portion of said hermetically sealed pipe to rupture it and when the bearing wear causes said rotary shaft to move in a radial direction, the inner peripheral wall of said enlarged chamber is urged against the outer peripheral wall of said enlarged end portion of said hermetically sealed pipe to rupture it.

Experimental tests have yielded the result that if provision is made of a first shoulder formed by enlarging the inner diameter of said hole provided for said one end of said rotary shaft, and a second shoulder formed by reducing the enlarged inner diameter of said hole, these shoulders are urged against said enlarged end sensitive portion of said hermetically sealed pipe to rupture it in an easy and reliable manner.

Another feature of the invention, therefore, is the provision of a bearing wear detecting device for canned motor driven pumps, comprising a rotary shaft of a canned motor driven pump having a hole extending in an axial direction from one end of said rotary shaft; a first shoulder formed at a position distant apart from said one end of said rotary shaft by a given distance and formed by enlarging the inner diameter of said hole; a second shoulder formed by reducing the inner diameter of said enlarged inner diameter; an enlarged chamber formed in said hole between said first and second shoulders; and a hermetically sealed pipe provided at its one end with an enlarged end sensitive portion, said enlarged end sensitive portion being enclosed in said enlarged chamber of said rotary shaft; whereby when the bearing wear causes the rotary shaft to move in a thrust direction, either one of said first and second shoulders is urged against a part of said enlarged end sensitive portion of said hermetically sealed pipe to rupture it and when the bearing wear causes the rotary shaft to move in a radial direction, the inner peripheral wall of said enlarged chamber is urged against the outer peripheral wall of said enlarged end sensitive portion of said hermetically sealed pipe to rupture it.

Experimental tests have further yielded the result that if an end nut is detachably engaged with said one end of said rotary shaft and if provision is made of a hole concentrically arranged with said rotary shaft and having a minimum diameter which is sufficient to pass therethrough said enlarged front end sensitive portion of said hermetically sealed pipe and an enlarged hole concentrically arranged with said hole, it is possible to easily form said hole in said one end of said rotary shaft and always maintain a suitable hole by merely replacing said end nut by a new one even when the hole becomes worn and ruptured.

Another feature of the invention, therefore, is the provision of a bearing wear detecting device for canned motor driven pumps, comprising a rotary shaft of a canned motor driven pump; and an end nut detachably engaged with one end of said rotary shaft; said end nut being provided therein with a hole and an enlarged chamber.

Experimental tests have yielded the result that if said hole of said end nut into which said hermetically sealed pipe is inserted is formed into an ellipse-, rectangular- or polygonal-shape, it is possible to easily insert said hermetically sealed pipe into and remove from the end nut and when the bearing wear causes the rotary shaft to move in a thrust direction, the end nut is easily urged against the hermetically sealed pipe to rupture it.

Alternatively, if the front end of the hermetically sealed pipe is formed into an ellipse-, rectangular- or polygonal-shape, it is also possible to obtain the above mentioned advantages.

A still further feature of the invention, therefore, is the provision of a bearing wear detecting device for canned motor driven pumps, comprising a rotary shaft of a canned motor driven pump; a hole formed at one end of said rotary shaft; and a hermetically sealed pipe having an enlarged end portion enclosed in said hole, said hole and/or said enlarged end portion of said hermetically sealed pipe being formed into an ellipse-, rectangular- or polygonal-shape.

A preferred embodiment of the invention consists of an indicating part and a hermetically sealed pipe body part. The hermetically sealed pipe body part is inserted with the rear part of a pump housing and secured thereto through a thread formed at one part of the hermetically sealed pipe body part. The hermetically sealed body part is provided at its front end with an enlarged portion which serves as a sensitive portion. In addition, the thickness of the outer peripheral wall of the sensitive portion is made thinner than that of the housing or can which totally encloses a pump therein for the purpose of easily rupturing the sensitive portion when the bearing wear causes the housing to urge against the sensitive portion. It is also preferable that the hermetically sealed pipe body part encloses therein a pressure fluid whose pressure is higher or lower than the inside pressure of the rotor chamber or is made substantially equal to the atmospheric pressure, thereby maintaining a pressure difference between the pressure of the fluid in the hermetically sealed body part and the inside pressure of the rotor chamber.

In the invention, it is preferable to enlarge the diameter of the enlarged chamber formed in the hole in the one end of the rotary shaft and enclosing therein the sensitive portion provided for the front end of the hermetically sealed pipe to such an allowable bearing wear limit that the bearing wear permits to come the rotary shaft to move in a radial direction toward the sensitive portion and enlarge the axial length of the enlarged chamber to such an allowable bearing wear limit that the bearing wear permits to cause the rotary shaft to move in front and rear thrust directions with respect to the sensitive portion.

Another feature of the invention is the provision of a bearing wear detecting device for canned motor driven pumps comprising an indicating part provided at its rear end with an indicator; a detecting part provided at its front end with a sensitive portion; and joint pipes made integral with said indicating and detecting parts, respectively, and telescopically engaged and hermetically sealed with each other when said device is mounted on a canned motor driven pump, said indicating part being inserted into and around said detecting part while increasing the inside pressure of the device.

Another feature of the invention is the provision of a bearing wear detecting device for canned motor driven pumps comprising further a hollow end nut threadedly engaged with one end of a rotary shaft of a canned motor and engaged with said sensitive portion of said detecting part, whereby said sensitive portion of said detecting part becomes worn and ruptured to leak out a pressure gas contained therein when said end nut is urged against it due to displacement of said rotor shaft in front and rear thrust directions, a radial direction and a composite direction resulted from both said thrust and radial directions.

The invention will now be described in greater detail with reference to the accompanying drawings, wherein:

FIG. 3 is an enlarged section showing a mounted condition of essential parts of the bearing wear detecting device according to the invention shown in FIG. 2;

FIG. 4 is an enlarged section showing a modified form of the end nut shown in FIG. 3;

FIG. 5 is a left side view of FIG. 4;

FIG. 5a is another left side view of FIG. 4 showing an alternative form.

FIG. 6 is an enlarged section showing another modified form of the end nut shown in FIG. 3;

FIG. 7 is a left side view of FIG. 6;

Figure 1:
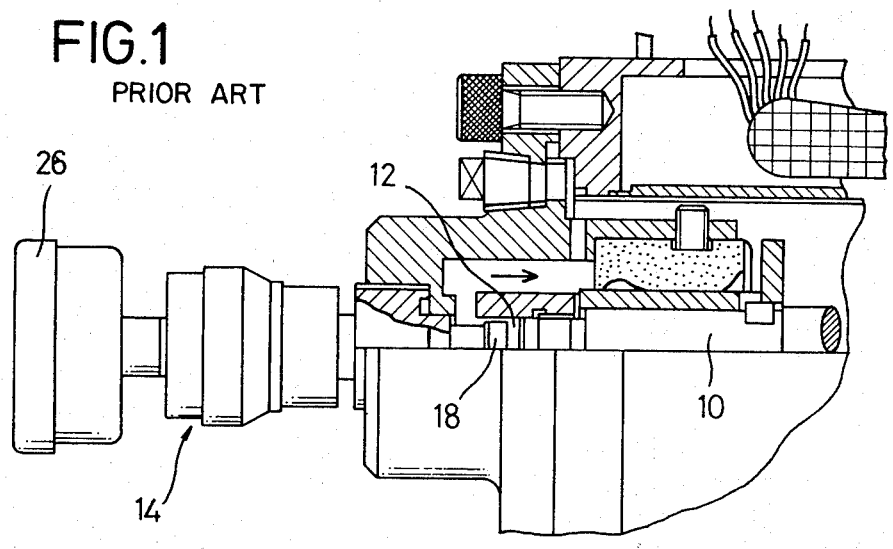
FIG. 1 is a front view showing a conventional bearing wear detector for canned motor driven pumps partly in section.
Figure 2:
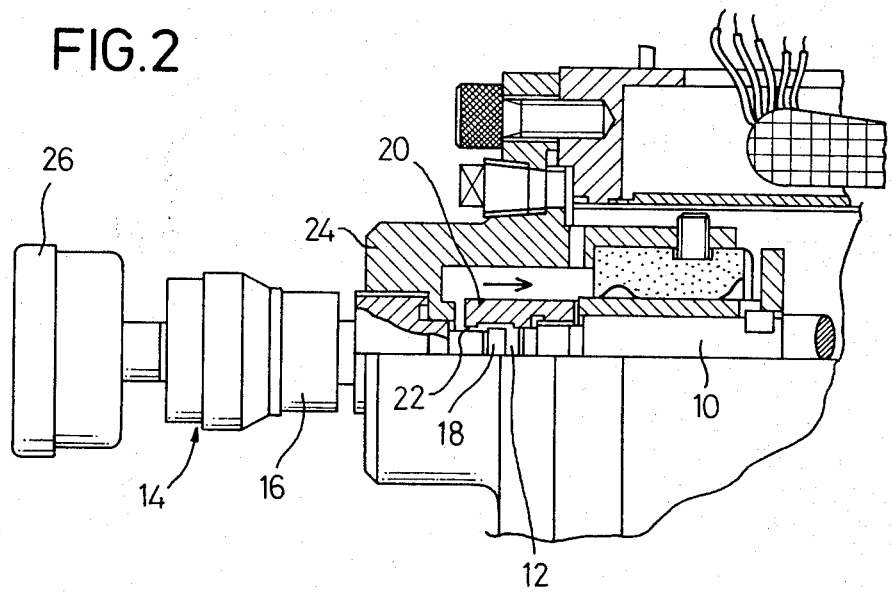
FIG. 2 is a front view showing one embodiment of a bearing wear detector for canned motor driven pumps according to the invention partly in section.

Referring to FIG. 2, reference numeral 10 designates a rotary shaft of a canned motor driven pump and 12 shows a cylindrical hole formed in one end of the rotary shaft 10. The rotary shaft 10 serves as a pump impeller shaft and a motor rotor shaft and rotatably jounalled by bearings. The bearings are subjected to both a radial load and a thrust load produced by a rotary motion of the canned motor driven pump.

With one end of the rotary shaft 10 is threadedly engaged an end nut 20 concentrically arranged with the rotary shaft 10. The end nut 20 is provided at its one end with a hole 22 concentrically arranged with the rotary shaft 10 as shown in FIG. 3. Alternatively, the hole 22 may directly be provided for one end of the rotary shaft 10.

A hermetically sealed pipe 16 of a detecting device 14 is inserted into and threadedly engaged with a part of a pump housing 24. The hermetically sealed pipe 16 is provided at its front end with an enlarged sensitive portion 18 which is inserted into the hole 22 formed at one end of the end nut 20.

As shown in FIG. 3, a diameter $d_1$ of the hole 22 is defined to the minimum dimension which can insert the sensitive portion 18 into the hole 22 without any hindrance. It is preferable to define the diameter $d_1$ of the hole 22 such that $d_1 - d_0$ ($d_0$ is an outer diameter of the sensitive portion 18) is approximately equal to 0.05mm.

That inner peripheral surface of the hole 22 in which is located the sensitive portion 18 of the hermetically sealed pipe 16 is enlarged to form an enlarged chamber 25 having an axial length $l_2$ which is equal to a sum of an axial length $l_1$ of the sensitive portion 18 and of an allowable amount of the bearing wear in front and rear thrust directions ($t_1 + t_2$) and having a diameter $d_3$ which is equal to a sum of an outer diameter $d_0$ of the sensitive portion 18 and of an allowable amount of bearing wear in a radial direction ($t_2 \approx 0.2$mm).

The provision of the enlarged chamber 25 in the hole 22 of the end nut 20 ensures formation of shoulders 25a, 25b at boundaries between the hole 22 and the enlarged chamber 25, respectively. The shoulder 25b opposed to the front end of the sensitive portion 18 may be closed without further extending the hole 22.

If the bearing wear in the front thrust direction and also in the radial direction causes the rotary shaft 10 to move, the shoulder 25a is urged against the sensitive portion 18 of the hermetically sealed pipe 16 to wear and rupture it.

On the contrary, if the bearing wear in the rear thrust direction and also in the radial direction causes the rotary shaft 10 to move, the shoulder 25b is urged against the sensitive portion 18 of the hermetically sealed pipe 16 to wear and rupture it.

In both cases, the inside pressure of the hermetically sealed pipe 16 is reduced and the degree of reduction of the inside pressure thereof and hence the bearing wear condition is indicated by an indicator 26 of the detecting device 14 (FIG. 2).

If the bearing wear in the radial direction causes the rotary shaft 12 to move, the inner peripheral wall 25c of the enlarged chamber 25 of the end nut 20 is urged against the outer peripheral surface of the sensitive portion 18 of the hermetically sealed pipe 16 to wear and rupture it. As a result, the inside pressure of the hermetically sealed pipe 16 is reduced and the degree of reduction of the inside pressure of the detecting device 14 and hence the bearing wear condition is indicated by the indicator 26 of the detecting device 14.

In FIGS. 4 and 5 is shown a modified end nut 20 having an ellipse-shaped hole 22. In the present embodiment, an minor axis of the ellipse-shaped hole 22 is made equal to $d_1$ and a major axis thereof is made equal to $d_3$. The present embodiment makes it possible to insert the sensitive portion 18 into and remove the end nut 20 in an easy manner. In addition, the bearing wear produced in the front and rear thrust directions can be detected in a more reliable manner. Alternatively, the hole 22 may also be deformed into a rectangular-or polygonal-shape as seen in FIG. 5a so as to obtain the same result as in the case of the ellipse-shaped hole 22.

In FIGS. 6 and 7 is shown another modified end nut 20. In the present embodiment, a center axis A—A of the hole 22 which is aligned with a center axis of the sensitive portion 18 is deviated from an existing center axis B—B of the enlarged chamber 25 to form the shoulder 25a at the boundary between the upper peripheral edges of the hole 22 and the enlarged chamber 25. The present embodiment is also capable of detecting the bearing wear in the same manner as in the previous embodiments. In the present embodiment, provision may be made of a front end cover 20a having an eccentric hole 22. In this case, the enlarged chamber 25 is formed beforehand in the end nut 20 by boring and then closed by the front end cover 20a as shown in FIG. 6, thereby significantly facilitating the manufacture of the end nut 20.

Figure 8:
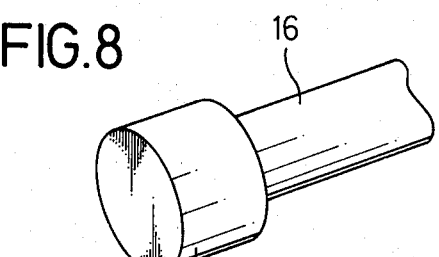
FIG. 8 is a perspective view showing a modified form of the sensitive portion of the detecting device according to the invention shown in FIG. 2.

In FIG. 8 is shown an ellipse-shaped sensitive portion 18 of the hermetically sealed pipe 16. The sensitive portion 18 may also be deformed into a rectangular- or polygonal-shape. The present embodiment makes it possible to easily insert the sensitive portion 18 into and remove from the end nut 20. In addition, the bearing wear produced in the front and rear thrust directions can be detected in a more reliable manner.

As stated hereinbefore, the embodiment of the detecting device according to the invention shown in FIGS. 2 to 8 has a number of advantages. In the first place, the use of only one detecting part ensures a detection of the bearing wear in a radial direction in front and rear directions. Secondly, it is simple in construction and easy in assembling and disassembling. Third, it can be manufactured in less expensive manner and in mass production scale. Finally, it may efficaciously be utilized as various kinds of bearing wear detecting devices and particularly as a bearing wear detecting device for canned motor driven pumps.

Figures 9, 9A:
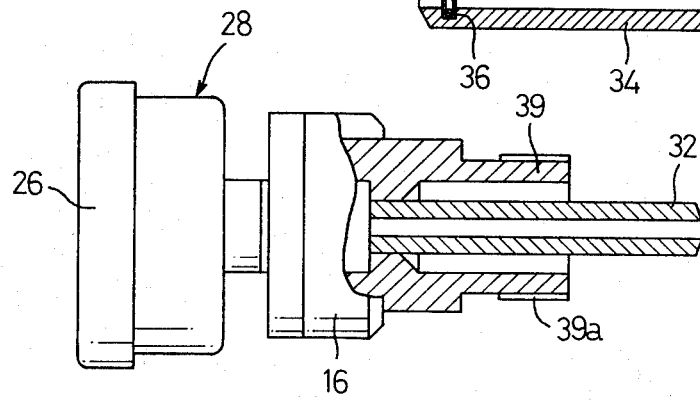
FIG. 9 is a front view showing a disassembled condition of essential parts of another embodiment of the bearing wear detector for canned motor driven pumps according to the invention partly in section.
FIG. 9a is a sectional view through the disassembled detecting part.

In FIG. 9 is shown another embodiment of the bearing wear detecting device according to the invention which is composed of an indicating part 28 and an detecting part 30. The indicating part 28 is provided at its front end with an indicator 26, while the detecting part 30 is provided at its rear end with a sensitive portion 18. The indicating part 28 is provided at its rear end with a joint pipe 32 which is located at a center axis of the indicating part 28 and projected outwardly from the rear end of the indicating part 28. The detecting part 30 mainly consists of a joint pipe 34 adapted to closely receive the joint pipe 32 inserted thereinto. That is, the joint pipe 32 of the indicating part 28 is detachably inserted into the joint pipe 34 of the detecting part 30. The joint pipe 34 is provided near its rear end with a groove 36 circumferentially extending along the inner wall of the joint pipe 34. An O-ring 38 is fitted in the groove 36 so as to hermetically seal the joint pipe 32 of the indicating part 28 with the joint pipe 34 of the detecting part 30. The indicating part 28 is also provided with a cylindrical portion 39 which is concentrically arranged around the joint pipe 32 and provided at its outer peripheral surface with threads 39a which serve to easily secure the indicating part 28 to the pump housing 24.

Figure 10:
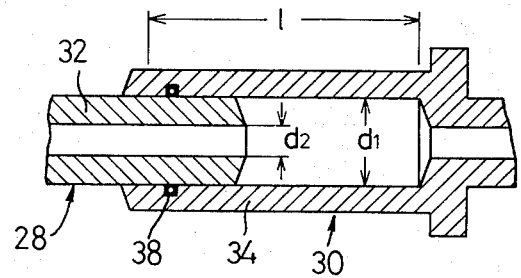
FIG. 10 is a section showing an assembled condition of the essential parts shown in FIG. 9.

In the case of connecting the indicating part 28 to the detecting part 30, the joint pipe 32, when inserted into the joint pipe 34, serves to compress air having a volume defined by a formula given by $(\pi/4 \times d_1^2 - d_2^2)l$ where $d_1$ is an inner diameter of the joint pipe 34 of the detecting part 30, $d_2$ is an inner diameter of the joint pipe 32 of the indicating part 28 and $l$ is a distance along which the joint pipe 32 of the indicating part 28 is inserted into the joint pipe 34 of the detecting part 30 as shown in FIG. 10. As a result, the inside pressure of the detecting device 14 is increased by a ratio of a volume of an air gap remained in the joint pipe 34 of the detecting part 30 to the volume defined by the above formula.

The bearing wear detecting device constructed as above described according to the invention may be secured to a canned motor driven pump as follows.

Figure 12:
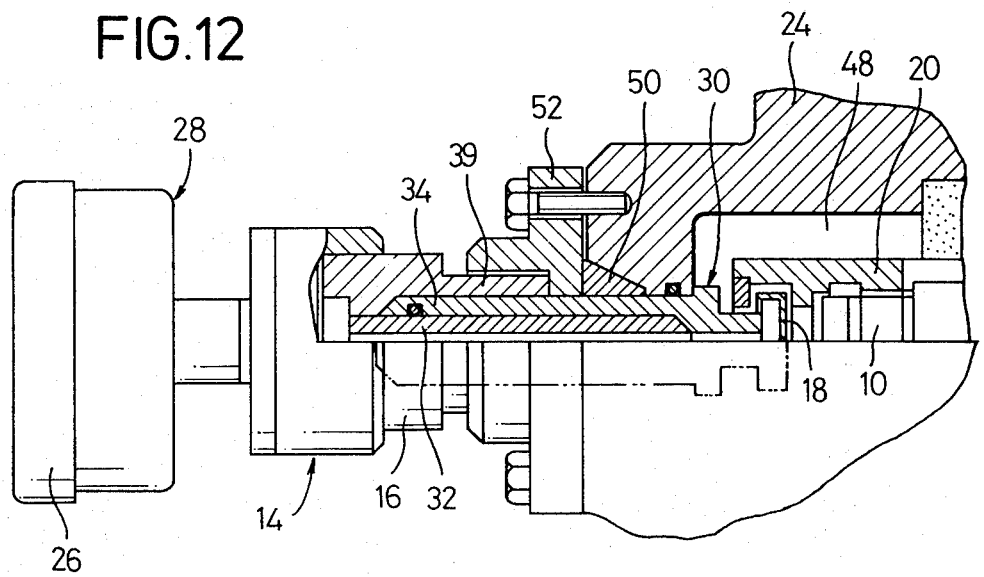
FIG. 12 is a front view showing the bearing wear detecting device shown in FIG. 9 in its condition applied to a pump housing partly in section.

The detecting part 30 of the bearing wear detecting device is separated beforehand from the indicating part 28 and the detecting part 30 only is secured to the pump housing 24 which forms therein a rear rotor chamber 48 of the canned motor driven pump as shown in FIG. 12. In this case, the sensitive portion 18 at the front end of the detecting part 30 is inserted into the end nut 20 secured to one end of the rotary shaft 10 and adapted to rapidly detect a displacement of the rotary shaft 10 occurred when a thrust bearing thereof has been worn.

Figure 11:
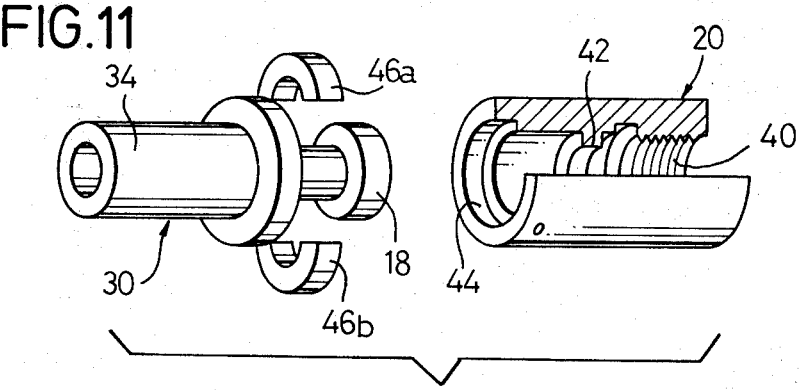
FIG. 11 is a perspective view showing a detecting part of the bearing wear detector shown in FIG. 9 and an end nut adapted to be engaged with the detecting part partly broken away.

In the present embodiment, the end nut 20 consists of a cylindrical body as shown in FIG. 11. The cylindrical end nut 20 is provided at its inner peripheral end with a female thread 40 adapted to be threadedly engaged with the rear end of the rotary shaft 10. In addition, the cylindrical body is provided substantially at its center inner periphery with a ridge 42 whose inner diameter is slightly smaller than an outer diameter of the sensitive portion 18 of the detecting part 30. The cylindrical end nut 20 is further provided at its rear end periphery with a groove 44 adapted to be engaged with two hollow disc halves 46a, 46b whose inner diameter is slightly smaller than the outer diameter of the sensitive portion 18 of the detecting part 30.

The sensitive portion 18 of the detecting part 30 is inserted into the end nut 20 and then the two hollow disc halves 46a, 46b are brought into engagement with the inner periphery of the groove 44 of the end nut 20 to insert the sensitive portion 18 into the end nut 40 such that the sensitive portion 18 could not be removed from the end nut 20.

As described above, the detecting part 30 is secured to the pump housing 24 for forming the rear rotor chamber 48 as shown in FIG. 12 and then is tightly fastened to the pump housing 24 by means of a washer 50 and an end flange 52.

Subsequently, into the joint pipe 34 of the detecting part 30 tightly fastened to the pump housing 24 as described above is tightly inserted the joint pipe 32 of the indicating part 28, thereby completing assembling and mounting of the bearing wear detecting device as shown in FIG. 12.

When thrust bearings of the canned motor driven pump become worn in either front or rear thrust direction, the rotary shaft 10 is moved in the axial direction and the end nut 20 is urged against the sensitive portion 18, and as a result, a part of the sensitive portion 18 becomes worn and ruptured to leak out a pressure gas contained therein. Such leakage of the pressure gas can be indicated by the indicator 26 provided for the indicating part 28. As a result, the bearing wear detecting device constructed as above described according to the invention is capable of reliably detecting the bearing wear of the canned motor driven pump in the thrust direction.

It is a matter of course that the bearing wear detecting device according to the invention can reliably detect the bearing wear in a composite direction resulted from a radial direction and the thrust direction.

Figure 13:
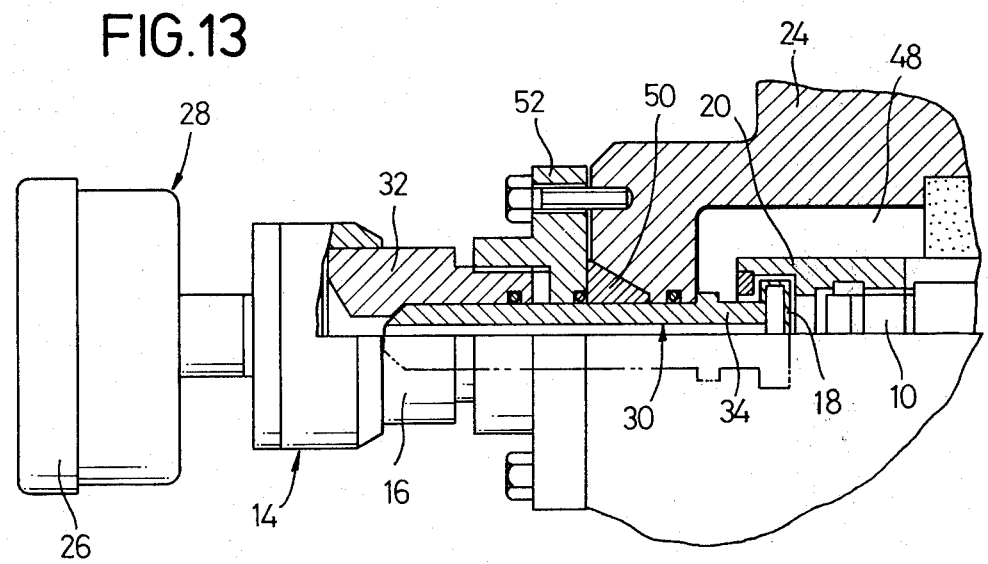
FIG. 13 is a front view showing another embodiment of the bearing wear detecting device according to the invention in its condition applied to a pump housing partly in section.

In FIG. 13 is shown another embodiment of the bearing wear detecting device for canned motor driven pumps according to the invention. In the present embodiment, the detecting part 30 is constructed in the manner similar to the previous embodiment. But, the joint pipe 32 of the indicating part 28 is formed into one cylindrical body which can be fitted around the outer periphery of the joint pipe 34 of the detecting part 30. The indicating part 28 according to the present embodiment has the advantage that it is simple in construction, easy in manufacture and can easily be secured to both the detecting part 30 and the pump housing 24.

As stated hereinbefore, the embodiment of the bearing wear detecting device according to the invention shown in FIGS. 9 to 13 has a number of advantages. In the first place, it is simple in construction. Secondly, the indicating part and detecting part can easily and reliably be assembled and disassembled. Third, it is possible to not only increase the inside pressure of both the indicating and detecting parts but also hermetically seal these parts with each other. Fourth, the bearing wear detecting device can easily be mounted on the canned motor driven pump housing at its installation site. Finally, the sensitive portion of the detecting part can be arranged such that it can reliably detect the movement of the rotary shaft in its front and rear thrust directions caused by the bearing wear.

Thus, the present embodiment of the bearing wear detecting device according to the invention shown in FIGS. 9 to 13 can reliably detect the bearing wear in a radial direction, front and rear thrust directions and a composite direction resulted from both the radial and thrust directions.

In addition, in the present embodiment of the bearing wear detecting device according to the invention, if the detecting part becomes ruptured, the ruptured detecting part only can be replaced by a new one, and as a result, the device is easy in maintenance and inspection and hence is significantly economical.

The invention is not restricted to the above mentioned preferred embodiments, but many modifications thereof may be made without departing from the spirit of the invention.

What is claimed is:
1. A bearing wear detecting device for canned motor driven pumps, comprising a rotary shaft of a canned motor driven pump having a hole extending in an axial direction from one end of said rotary shaft; an enlarged chamber formed in said rotary shaft at a position distant apart from said one end of said rotary shaft by a given distance and having a diameter larger than that of said hole and forming shoulders at boundarys between said hole and said enlarged chamber; and a hermetically sealed pipe provided at its one end with an enlarged sensitive portion and at another end with an indicator, said enlarged sensitive portion being enclosed in said enlarged chamber of said rotary shaft, whereby when the bearing wear causes said rotary shaft to move in a thrust direction, said shoulders are urged against a part of said enlarged end sensitive portion of said hermetically sealed pipe to rupture it and when the bearing wear causes said rotary shaft to move in a radial direction, the inner peripheral wall of said enlarged chamber is urged against the outer peripheral portion of said enlarged end sensitive portion of said hermetically sealed pipe to rupture it, thereby indicating the degree of the bearing wear.

2. The bearing wear detecting device for canned motor driven pumps as claimed in claim 1, wherein said chamber is provided with two shoulders spaced at a predetermined distance from each other, either one of said shoulders being urged against said end sensitive portion on movement in the thrust direction.

3. A bearing wear detecting device for canned motor driven pumps as claimed in claim 1, comprising further an end nut detachably engaged with said one end of said rotary shaft and provided therein with a hole and an enlarged chamber.

4. A bearing wear detecting device for canned motor driven pumps as claimed in claim 1, wherein said hole is elliptical.

5. A bearing wear detecting device for canned motor driven pumps as claimed in claim 1, wherein said hole is rectangular.

6. A bearing wear detecting device for canned motor driven pumps as claimed in claim 1, wherein said hole is polygonal.

7. A bearing wear detecting device for canned motor driven pumps as claimed in claim 1, wherein said hermetically sealed pipe is composed of an indicating part provided at its rear end with an indicator and a detecting part provided at its front end with said enlarged sensitive portion, said indicating and detecting parts including joint pipes made integral therewith, respectively, and telescopically engaged and hermetically sealed with each other when said device is mounted on a canned motor driven pump, said indicating part being inserted into and around said detecting part while increasing the inside pressure of the device.

8. A bearing wear detecting device for canned motor driven pumps as claimed in claim 1 and comprising further a hollow end nut threadedly engaged with one end of said rotary shaft of a canned motor driven pump and engaged with said sensitive portion of said detecting part, whereby said sensitive portion of said detecting part becomes worn and ruptured to leak out a pressure gas contained therein when said end nut is urged against it due to deviation of said rotary shaft in front and rear thrust directions, a radial direction and a composite direction resulted from both said thrust and radial directions.

* * * * *